(12) United States Patent
Klüver et al.

(10) Patent No.: US 8,208,342 B2
(45) Date of Patent: Jun. 26, 2012

(54) METHOD FOR COMBINING SIGNALS OF PRESSURE AND PARTICLE MOTION SENSORS IN MARINE SEISMIC STREAMERS

(75) Inventors: Tilman Klüver, Sande (NO); Anthony James Day, Drammen (NO)

(73) Assignee: PGS Geophysical AS, Lysaker (NO)

( * ) Notice: Subject to any disclaimer, the term of this patent is extended or adjusted under 35 U.S.C. 154(b) by 513 days.

(21) Appl. No.: 12/584,966

(22) Filed: Sep. 14, 2009

(65) Prior Publication Data

US 2011/0063948 A1 Mar. 17, 2011

(51) Int. Cl.
*G01V 1/38* (2006.01)

(52) U.S. Cl. .......................................... 367/24

(58) Field of Classification Search ............... 367/15, 367/21, 24
See application file for complete search history.

(56) References Cited

U.S. PATENT DOCUMENTS

| | | | |
|---|---|---|---|
| 6,314,371 B1 | 11/2001 | Monk | |
| 7,123,543 B2 | 10/2006 | Vaage et al. | |
| 7,359,283 B2 * | 4/2008 | Vaage et al. | 367/24 |
| 2008/0186804 A1 * | 8/2008 | Amundsen et al. | 367/24 |
| 2009/0067285 A1 * | 3/2009 | Robertsson et al. | 367/24 |
| 2009/0185444 A1 | 7/2009 | Klüver | |
| 2010/0211319 A1 * | 8/2010 | van Manen et al. | 702/14 |

OTHER PUBLICATIONS

Dennis Cooke, et al., (2008), "Simultaneous time imaging, velocity estimation and multiple suppression using local event slopes", SEG Las Vegas Annual Meeting, Expanded Abstracts,, pp. 2241-2245.
Sergey Fomel (2005), "Velocity-independent time-domain seismic imaging using local event slopes", SEG Houston Annual Meeting, Expanded Abstracts, pp. 2269-2274.
J. Robertsson, I. Moore, M. Vassalo, K. Ozdemir, D. Van Manen, A. Ozbek, (2008), "On the use of multicomponent streamer recordings for reconstruction of pressure wavefields in the crossline direction", Geophysics, vol. 73, No. 5.
European Search Report, mailing date Dec. 27, 2010.

* cited by examiner

Primary Examiner — Jack W Keith
Assistant Examiner — Krystine Breier (57) ABSTRACT

A cross-line slowness is determined for each sample in the signals in towed marine seismic streamers. A range of assumed cross-line slownesses is selected. Vertical wavenumbers are determined using the range of assumed cross-line slowness determined for samples in the signals of pressure sensors and particle motion sensors in the towed marine seismic streamers. The determined vertical wavenumbers are used to correct the particle motion sensor signals for angle of incidence along the direction of the seismic streamers and transverse thereto to generate a corrected particle motion sensor signal. The corrected particle motion sensor signals are combined based on the determined cross-line slowness for the samples. The corrected particle motion sensor signal and the pressure sensor signal are used to determine at least one of upgoing and downgoing pressure components and upgoing and downgoing particle motion components of the particle motion sensor and pressure sensor seismic signals.

18 Claims, 7 Drawing Sheets

METHOD FOR COMBINING SIGNALS OF PRESSURE AND PARTICLE MOTION SENSORS IN MARINE SEISMIC STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More specifically, the invention relates to methods for processing signals acquired using streamers having both pressure responsive sensors and motion responsive sensors.

2. Background Art

In seismic exploration, geophysical data are obtained by applying acoustic energy to the earth from an acoustic source and detecting seismic energy reflected from interfaces between different layers in subsurface earth formations. The seismic wavefield is reflected when there is a difference in acoustic impedance between the layer above the interface and the layer below the interface. When using towed streamers in marine seismic exploration, one or more seismic streamers is towed behind an exploration vessel at a water depth typically between about six to about nine meters, but can be towed shallower or deeper. Seismic sensors (also known as seismic receivers) are included in the streamer cable for detecting seismic signals. Typically employed are pressure sensitive sensors, such as hydrophones, and particle motion sensitive sensors, such as geophones. The seismic sensors convert the seismic wavefields into electrical or optical signals that are typically recorded for signal processing, and evaluated to estimate characteristics of the subsurface of the earth.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. The image of the structure of the Earth's subsurface is produced in order to enable an interpreter to select locations with the greatest probability of having petroleum accumulations.

In a typical geophysical exploration configuration, a plurality of streamer cables are towed behind a vessel. One or more seismic sources are also normally towed behind the vessel. The seismic source, which typically is an airgun array, but may also be a water gun array or other type of source known to those of ordinary skill in the art, transmits seismic energy or waves into the earth and the waves are reflected back by reflectors in the earth and recorded by sensors in the streamers. Paravanes are typically employed to maintain the cables in the desired lateral position while being towed. Alternatively, the seismic cables are maintained at a substantially stationary position in a body of water, either floating at a selected depth or lying on the bottom of the body of water, in which case the source may be towed behind a vessel to generate acoustic energy at varying locations, or the source may also be maintained in a stationary position.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection. An alternative to having the geophone and hydrophone co-located, is to have sufficient spatial density of sensors so that the respective wavefields recorded by the hydrophone and geophone can be interpolated or extrapolated to produce the two wavefields at the same location.

In order to properly account for the directional sensitivity of the particle motion sensor, the angle of incidence along the seismic streamers and transverse thereto is required. Therefore, a need exists for a method for combining pressure and particle motion signals that accounts for the angle of incidence for 3-D acquisition geometries.

SUMMARY OF THE INVENTION

The invention is a method for combining signals of pressure sensors and particle motion sensors in towed marine seismic streamers. Cross-line slowness is determined for samples in the signals in the streamers. A range of assumed cross-line slownesses are selected. Vertical wavenumbers are determined for the range of assumed cross-line slownesses. The determined vertical wavenumbers are used to correct the particle motion sensor signals for angle of incidence along the direction of the seismic streamers and transverse thereto to generate a corrected particle motion sensor signal. The corrected particle motion sensor signals are combined based on the determined cross-line slowness for the samples. The corrected particle motion sensor signal and the pressure sensor signal are used to determine at least one of upgoing and downgoing pressure components and upgoing and downgoing particle motion components of the particle motion sensor and pressure sensor seismic signals.

Other aspects and advantages of the invention will be apparent from the following description and the appended claims.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION

Figure 1A:
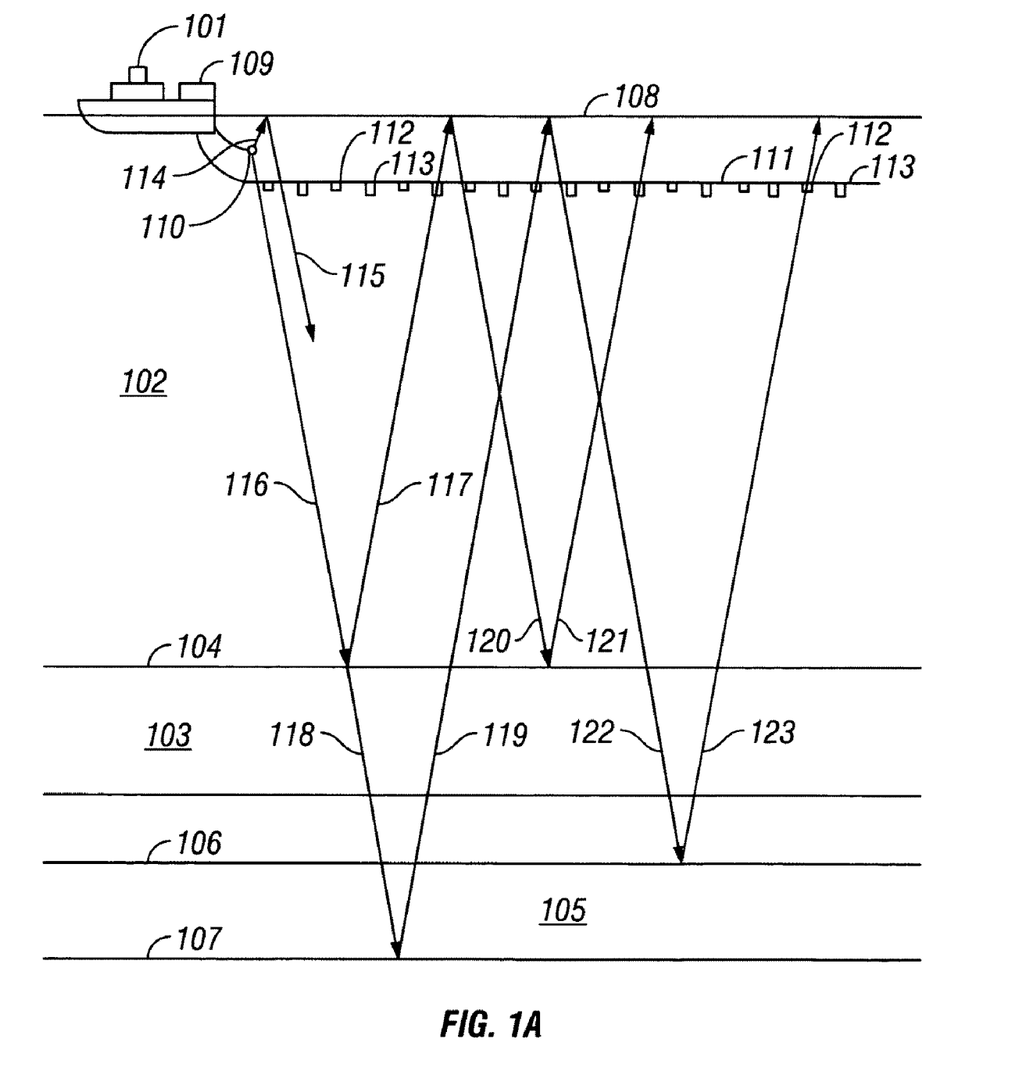
FIG. 1A is an illustration of a method for acquiring marine seismic data that can be used with the method of the invention.

FIG. 1A shows a signal acquisition arrangement (not drawn to scale) for acquiring marine seismic signals that can be used with a method according to the invention. A seismic vessel 101 moves along the surface 108 of a body of water 102 above the earth's subsurface 103. Beneath the water bottom 104, the earth's subsurface 103 contains formations of interest such as layer 105 positioned between an upper boundary 106 and a lower boundary 107. The seismic vessel 101 includes seismic acquisition control equipment, designated generally at 109. The seismic acquisition control equipment 109 includes (none shown separately) navigation control, seismic source control, seismic sensor control, and recording equipment, all of which are well known in the art of seismic data acquisition.

The seismic acquisition control equipment 109 causes a seismic source 110 towed in the body of water 102 by the seismic vessel 101 (or by another vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 to record the acoustic wavefields initiated by the seismic source 110 and reflected from interfaces in the environment. Although only one seismic streamer 111 is shown in FIG. 1A for illustrative purposes, typically a plurality of seismic streamers 111 are towed behind the seismic vessel 101 at laterally spaced apart positions from the centerline of the vessel 101. Such plurality of streamers and their respective positions will be explained below with reference to FIG. 1B.

Still referring to FIG. 1A, the seismic streamers 111 contain sensors to detect the reflected wavefields initiated by the seismic source 110. The seismic streamers 111 include pressure responsive sensors such as hydrophones 112 and water particle motion responsive sensors such as geophones 113. The hydrophones 112 and geophones 113 are typically co-located in pairs or pairs of sensor arrays at selected intervals along the seismic streamers 111. However, the type of sensors 112, 113 and their locations along the seismic streamers 111 are not intended to be a limitation on the scope of the present invention.

Each time the seismic source 110 is actuated, an acoustic wavefield travels outwardly in spherically expanding wave fronts. The propagation of the wave fronts will be illustrated herein by ray paths which are perpendicular to the wave fronts. Upwardly traveling wavefield, designated by ray path 114, will reflect from the water-air interface at the water surface 108 and then travel downwardly, as in ray path 115, where the wavefield may be detected by the hydrophones 112 and geophones 113 in the seismic streamers 111. Such a reflection at the water surface 108, as in ray path 115, contains no useful information about the subsurface formations of interest. However, such surface reflections, also known as "ghosts", act in the manner of secondary seismic sources with a time delay.

Downwardly traveling wavefield, in ray path 116, will reflect from the earth-water interface at the water bottom 104 and then travel upwardly, as in ray path 117, where the wavefield may be detected by the hydrophones 112 and geophones 113. Such a reflection at the water bottom 104, as in ray path 117, contains information about the water bottom 104, which may or may not be of interest. The downwardly traveling wavefield, as in ray path 116, may transmit through the water bottom 104 as in ray path 118, reflect from a layer boundary, such as 107, of a layer, such as 105, and then travel upwardly, as in ray path 119. The upwardly traveling wavefield, as in ray path 119, may then be detected by the hydrophones 112 and geophones 113. Such a reflection from a layer boundary 107 contains useful information about a formation of interest 105 and is an example of a primary reflection, having one reflection in the subsurface formations below the water bottom.

However, the acoustic wavefields continue to reflect from interfaces such as the water bottom 104, water surface 108, and layer boundaries 106, 107 in combinations. For example, the upwardly traveling wavefield in ray path 117 will reflect from the water surface 108, continue traveling downwardly in ray path 120, may reflect from the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect from the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subsurface. Multiple reflections contain redundant information about the formations of interest and commonly are removed from seismic data before further processing.

Figure 1B:
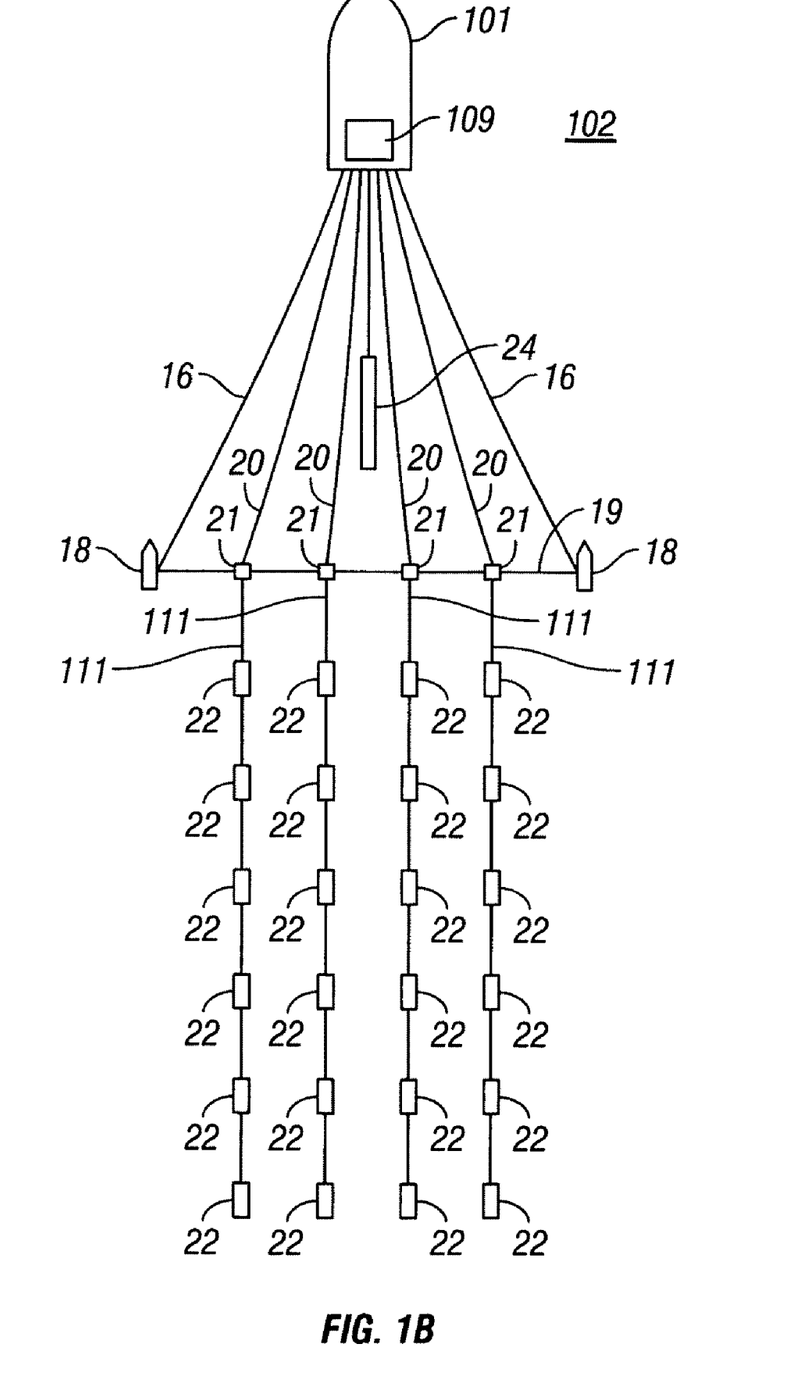
FIG. 1B shows a typical array of laterally spaced apart streamers.

A typical arrangement for acquiring three dimensional seismic data as may be used with methods according to the invention is shown schematically in FIG. 1B. The system may include a plurality of seismic sensor streamers 111 towed by the seismic vessel 101 as shown, or by a different vessel. The streamers 111 extend behind the vessel 101 for a certain distance. Seismic sensors 22 may each be a combination of a pressure responsive sensor (e.g., a hydrophone 112) and a motion responsive sensor (e.g., a geophone 113) as explained above with reference to FIG. 1A. Geometry of the streamers 111 is maintained by various towing devices including lateral force generating devices called "paravanes" 18 disposed at the end of paravane lead in ropes 16. The streamers 111 are coupled at their forward end to respective termination 21 which couples the streamer 111 to a respective lead in cable 20. The paravane lead in ropes 16 and lead in cables 20 may be deployed from the vessel 101 and retrieved thereon by winches (not shown) or similar spooling device. The lateral separation of the paravanes 18 may be limited by a spreader cable 19 ultimately to maintain the geometry of the entire array of streamers 111.

The seismic vessel 101 may also tow, or another vessel may tow one or more seismic source arrays 24. Only one such array is shown in FIG. 1B for clarity. The source array 24 typically includes a plurality of air guns of various chamber sizes such that, upon selectably timed actuations of all the individual air guns in the array 24, a seismic energy pulse of suitable spectral content is imparted to the water 102. The manner of recording the signals detected by the various seismic sensors 22 (such as the hydrophones 112 and geophones 113 shown in FIG. 1A) is well known in the art and will not be further described herein.

U.S. Pat. No. 7,359,283, issued Apr. 15, 2008 to Vaage et al. and assigned to an affiliate of the assignee of the present invention, describes methods for using streamers having both pressure responsive sensors and particle motion responsive sensors. By having both types of sensors it is possible to reduce the effects of the ghost on the detected seismic signals. In the method described in the Vaage et al. '283 patent, the signals generated by the particle motion responsive sensors have their amplitudes adjusted for the angle of incidence of the seismic signals at the time of detection by the motion responsive sensors. Such angle of incidence will depend on, among other factors, the seismic velocities of the various formations below the water bottom and the location of the seismic sensors with respect to the seismic energy source. The method of the Vaage et al. '283 patent may be performed in two dimensions, that is, in a direction along one or more individual streamers, or in three dimensions, that is, for surveys conducted using a plurality of laterally spaced apart streamers towed by a seismic vessel such that angle of incidence is calculated in both the longitudinal (along the streamer or "in-line") direction and transverse (perpendicular to the streamer or "cross-line") direction. In three dimensions, the seismic signals have an angle of incidence at each of the motion responsive sensors on each streamer that depends on the distance of each sensor from the source in both the longitudinal (in-line) and transverse (cross-line) directions.

The method of the Vaage et al. '283 patent is most effective in three dimensions when applied with dense spatial sampling of the seismic signals in both the in-line and cross-line directions, to avoid spatial aliasing. In practice, for marine streamer surveys the spatial sampling interval in the in-line direction is typically 12.5 meters, which is sufficient to limit spatial aliasing effects within the seismic frequency range. However, the spatial sampling (distance between streamers) in the cross-line direction is rarely less than 50 meters and is more often 100 meters. The present invention is a method for avoiding spatial aliasing effects in the separation of the signals recorded by pressure responsive sensors and motion responsive sensors into upgoing and downgoing parts.

The signals from the pressure responsive sensors and the particle motion responsive sensors located in seismic streamers are combined to determine upgoing and downgoing components of the measured seismic signals. The invention will be illustrated by the calculation of upgoing components of pressure signals. It will be appreciated by those skilled in the art that the methods described herein are equally applicable to the calculation of downgoing pressure, and up- and downgoing vertical velocity. Upgoing pressure is only one particular implementation. Such components are useful for further seismic processing, such as attenuation of multiple reflections in marine seismic signals. Because the particle motion responsive signals are typically affected by low frequency noise due to towing induced vibrations in the streamers, the signal-to-noise ratio for the combined signals would be poor if the signals were merely combined. As explained in the Vaage et al. '283 patent, however, the particle motion responsive sensor signal may be calculated from the pressure responsive sensor signal within a selected frequency range if the spectrum of the pressure responsive sensor signal has a satisfactory signal-to-noise ratio within such frequency range.

The method of the invention uses particle motion sensors that are responsive to motions in the particles of the water. In general, particle motion sensors may be responsive to the displacement of the particles, the velocity of the particles, or the acceleration of the particles in the medium. The present embodiment is illustrated with particle velocity sensors, which are the most commonly used particle motion sensors. If, in another embodiment, particle motion sensors are used which are responsive to position, then the position signal is differentiated to convert it to a particle velocity signal by computational means well known in the art. If, in yet another embodiment, particle motion sensors are used which are responsive to acceleration (typically called accelerometers), then the particle acceleration signal is integrated to convert it to a particle velocity signal by computational means well known in the art.

In another embodiment, multi-component, e.g., three orthogonal component, motion sensors may be used. For clarity only, the present embodiment will be illustrated by the use of geophones, but the disclosed embodiment is not meant to limit the scope of the present invention. In the particular embodiment of a three-component geophone, a geophone is mounted to detect particle velocity in the vertical direction. Such geophone is called a "vertical" geophone. Two geophones are mounted in orthogonal directions with respect to each other, and to the vertically mounted geophone, to detect horizontal motion. Typically, a three-component geophone is oriented to sense motion in the vertical direction, in an in-line direction, and in a cross-line direction.

Figure 2:
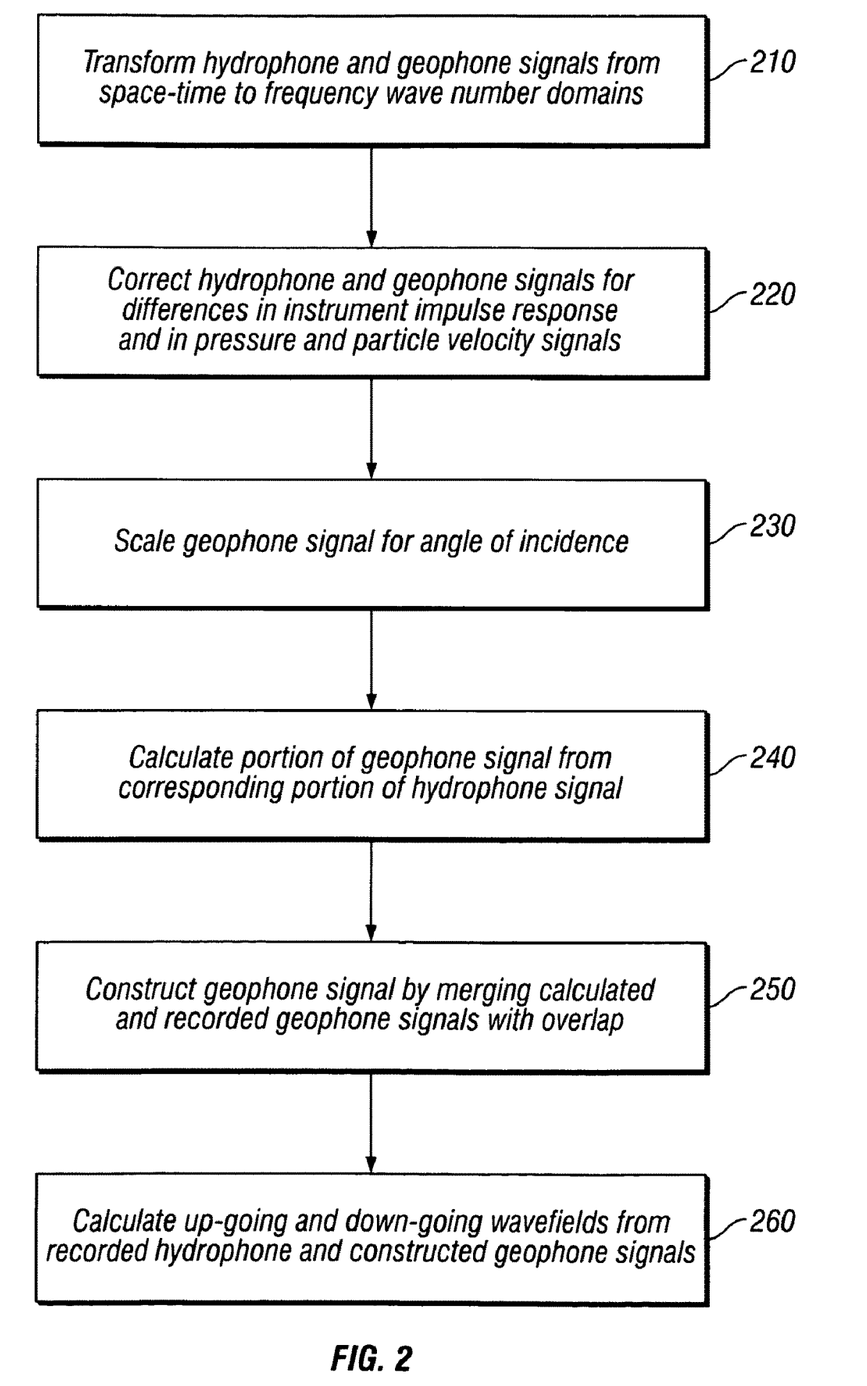
FIG. 2 is a flowchart illustrating an embodiment of the method of the invention for combining signals of pressure sensors and particle motion sensors in a marine seismic streamer.

FIG. 2 is a flowchart illustrating an embodiment of the method of the invention for combining signals of pressure sensors and particle motion sensors in a marine seismic streamer. In one example, x (position or space) is a vector and is equal to (x, y), where x represents the longitudinal (in-line) direction along the streamers and y represents the transverse (cross-line) direction. In other examples, as will be explained below, y can be kept constant so that signals from each streamer are analyzed separately. In one example, k (wave number) is a vector and equal to $(k_x, k_y)$, where $k_x$ is the wave number in the x direction and $k_y$ is the wave number in the y direction.

Referring to the flowchart in FIG. 2, at 210, the hydrophone and geophone signals are transformed from the space-time domain to the frequency-wavenumber (f, k) domain. At 220 in FIG. 2, the transformed hydrophone and geophone signals, H(f, k) and G(f, k), respectively, from the domain transform at 210 are corrected for relative differences between the sensor transfer functions, which correspond to sensor impulse responses in the time domain. Such corrections could include, for example, correcting the amplitude and phase of the hydrophone signals to match the geophone signals, correcting the geophone signals to match the hydrophone signals, or correcting both sets of signals to a common basis. Correcting for relative differences in sensor impulse responses is well known in the art. Finally, an amplitude scaling equal to the acoustic impedance in the water may be applied to the geophone signals to correct for the relative differences in amplitudes of pressure and particle velocity. Such scaling is also well known in the art.

At 230 in FIG. 2, the corrected geophone signals from 220 are further corrected for angle of incidence. While a hydrophone records the total pressure wavefield, a vertical geophone will only record the vertical component of the particle motion wavefield. The vertical part will be equal to the total particle motion wavefield only for signals which are propagating vertically, i.e. for which the angle of incidence equals zero. For any other angle of incidence the geophone signals need to be scaled, for example, substantially as described in the Vaage et al. '283 patent.

At 240 in FIG. 2, a low frequency part of the geophone signal can be calculated or estimated from the recorded hydrophone signal. The foregoing may also be performed substantially as explained in the Vaage et al. '283 patent.

At 250 in FIG. 2, a full bandwidth geophone signal can be calculated or estimated by merging the calculated low frequency portion thereof with the measured geophone signals in an upper part of the frequency spectrum, including some overlap. The foregoing may also be performed substantially as explained in the Vaage et al. '283 patent.

At 260 in FIG. 2, a full bandwidth geophone data set and the recorded hydrophone data set are added or subtracted to calculate a full bandwidth upgoing and downgoing wavefield. The foregoing can be performed substantially as explained in the Vaage et al. '283 patent.

In the method of the invention, determining the wavenumbers ($k_x$, $k_y$) in both the x and y directions is required. This determination could be helped by interpolation between the streamers to provide sufficient spatial sampling in the y direction, but the method of the invention provides another approach. This alternative approach is described below in more detail with reference to the flowcharts in FIGS. 3 and 4.

In particular, when 2-D dual-sensor streamer data are processed, the wavefield separation in 260 in FIG. 2 would be performed using the equations in the Vaage et al. '283 patent with $k_y$ set to zero, given the difficulty in deriving information about the cross-line component of slowness. If this approach is applied to data with significant cross-line dips, errors will occur. However, if the cross-line component of slowness, $p_y$, is known, then the method disclosed in the Vaage et al. '283 patent can be used to perform wavefield separation for an individual streamer with vertical wavenumber $k_z$ estimated as follows:

$$k_z = \sqrt{\left(\frac{\omega}{c}\right)^2 - k_x^2 - \omega^2 p_y^2}, \quad (1)$$

where $\omega = 2\pi f$ is the angular frequency and c is the velocity of sound in the medium. This estimate of $k_z$ in Equation (1) is used to determine the angle of incidence scaling applied to the geophone in 230 in FIG. 2, which is a prerequisite for accurate low frequency reconstruction of the geophone signal in 240 and for wavefield separation in 260 in FIG. 2. This estimate is the basis of the 3-D processing scheme presented here as an embodiment of the method of the invention.

Figure 3:
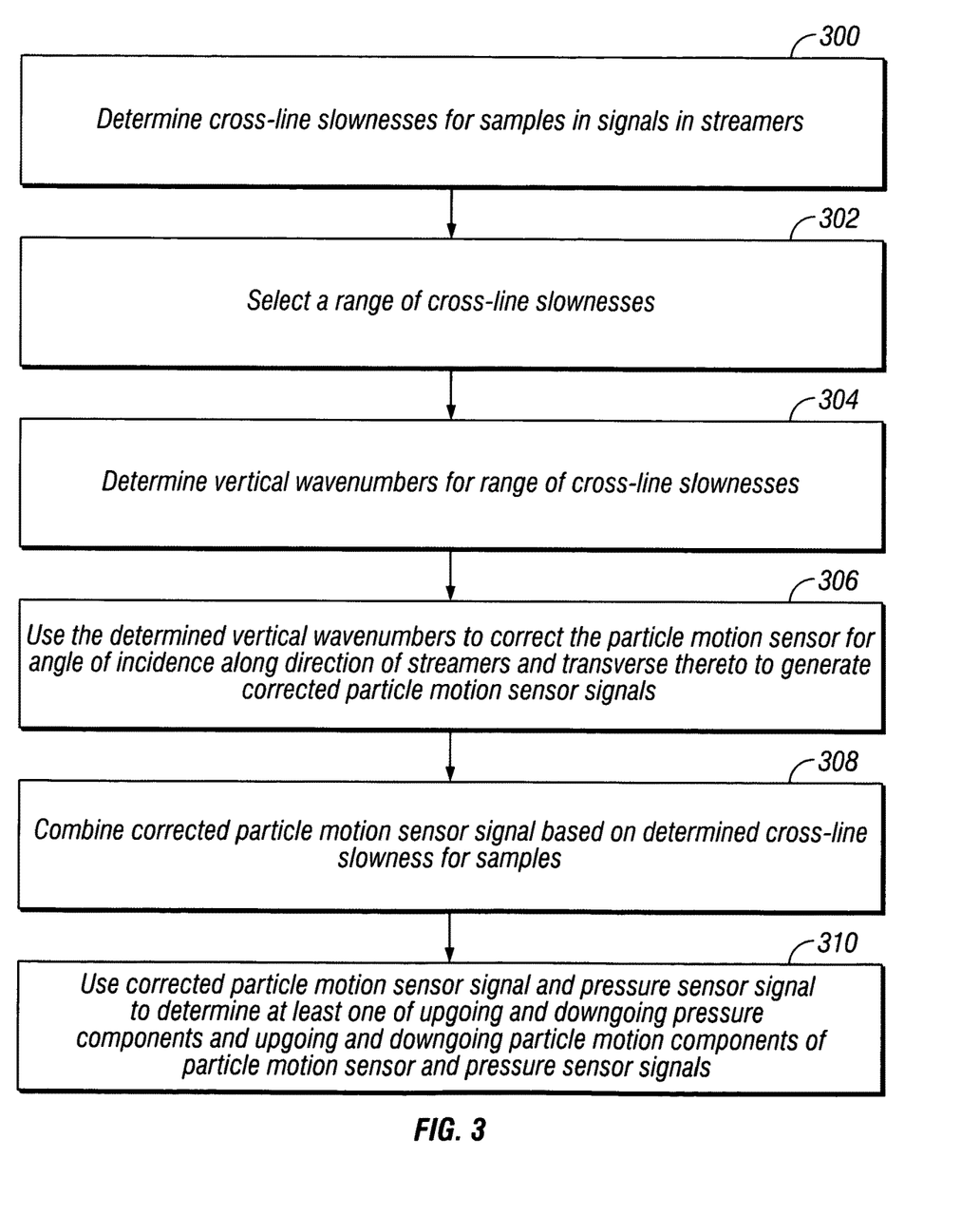
FIG. 3 is a flowchart illustrating an embodiment of the method of the invention for combining signals of pressure sensors and particle motion sensors in a marine seismic streamer.

FIG. 3 is a flowchart illustrating an embodiment of the method of the invention for combining signals of pressure sensors and particle motion sensors in a marine seismic streamer. In this embodiment, seismic signals recorded from marine streamers, representative of earth's subsurface and acquired by deploying a plurality of pressure sensors and particle motion sensors proximate an area of the earth's subsurface to be evaluated, the sensors generating at least one of an electrical and optical signal in response to seismic energy, are converted into at least one of upgoing and downgoing components of the seismic signals. The method of the invention involves repeated processing of recorded seismic data for individual streamers in a 2-D sense for multiple assumed cross-line slownesses. The actual cross-line slowness is independently determined for each sample. The sections derived for multiple assumed cross-line slownesses are then combined based on the actual slowness at each sample position.

At 300, cross-line slownesses are determined for each sample in the signals in each streamer. At 302, a range of assumed cross-line slownesses is selected. At 304, vertical wavenumbers are determined for the range of assumed cross-line slownesses. At 306, the determined vertical wavenumbers are used to correct the particle motion sensor signals for angle of incidence along the direction of the streamers and transverse thereto to generate corrected particle motion sensor signals. At 308, the corrected particle motion sensor signals are combined based on the determined cross-line slowness for the samples. At 310, the corrected particle motion sensor signal and the pressure sensor signal are used to determine at least one of upgoing and downgoing pressure components and upgoing and downgoing particle motion components of the particle motion sensor and pressure sensor signals, useful for imaging the earth's subsurface.

Figure 4:
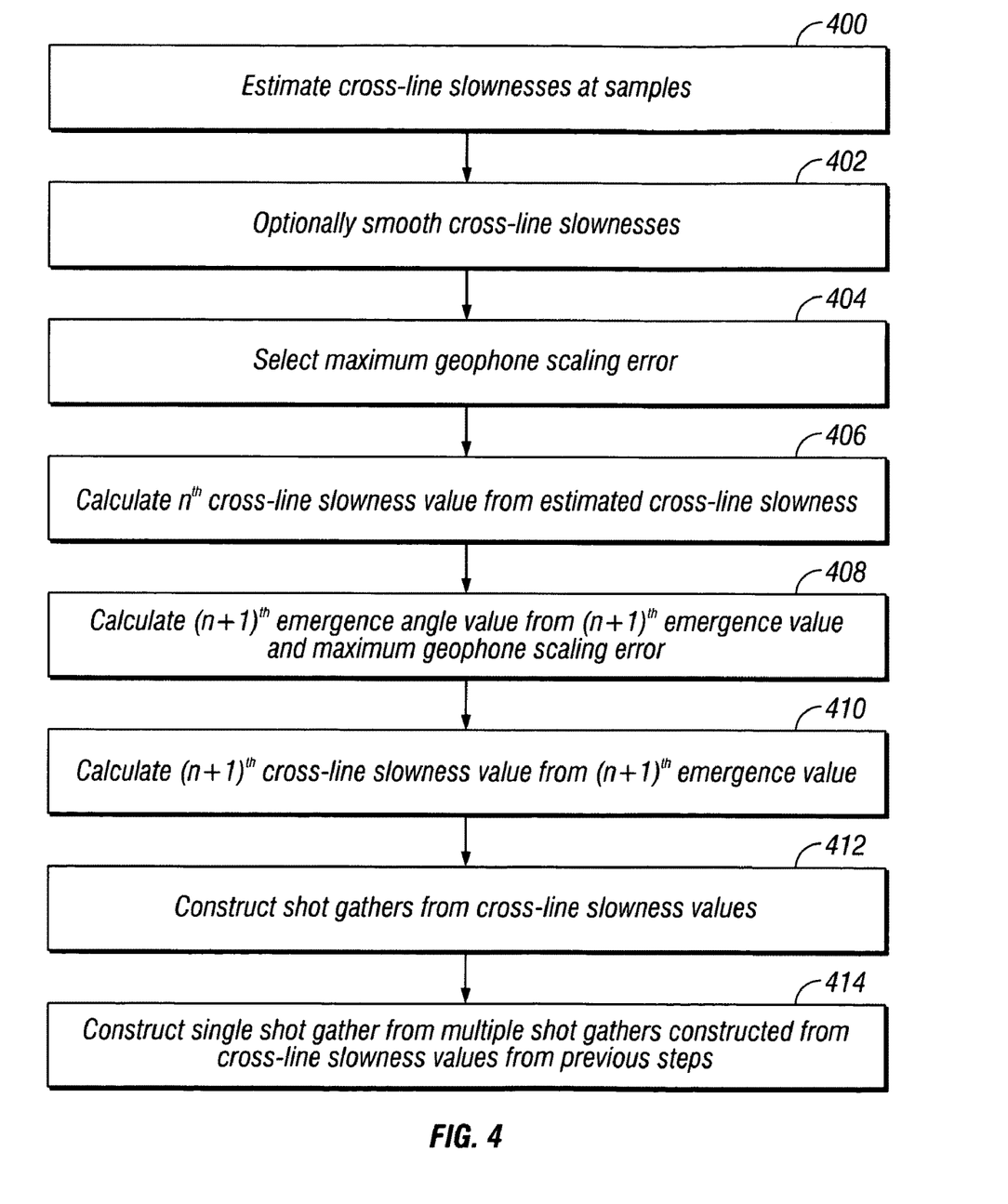
FIG. 4 is a flowchart illustrating an embodiment of the method of the invention for determining cross-line slowness.

FIG. 4 is a flowchart illustrating an embodiment of the method of the invention for determining cross-line slowness. At 400, the cross-line slowness is estimated at each sample. This estimation could be achieved by any suitable method, such as, for example, calculating the cross-line slownesses from stacking/RMS velocities or applying maximum semblance analysis to the recorded streamer data. However, since the slownesses can be estimated by a variety of available methods, the invention is not limited by the particular method of estimation employed.

One embodiment using semblance analysis will be illustrated by two examples, one for synthetic data and one for field data. Both examples employ a six-streamer spread. In the synthetic data example, semblance is calculated for cross-line slownesses between 0 and ±50 msec between adjacent streamers, which corresponds to a maximum cross-line incidence angle of ±49° for zero in-line slowness. The absolute cross-line slowness value that gives the maximum semblance at each sample is determined.

Figure 5:
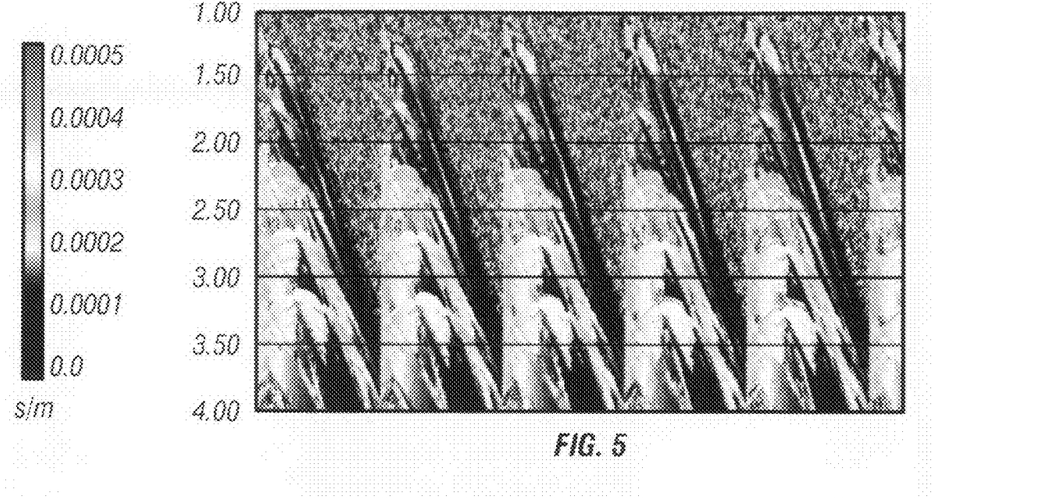
FIG. 5 is a section showing cross-line slowness estimates obtained for a synthetic data example.
Figure 6:
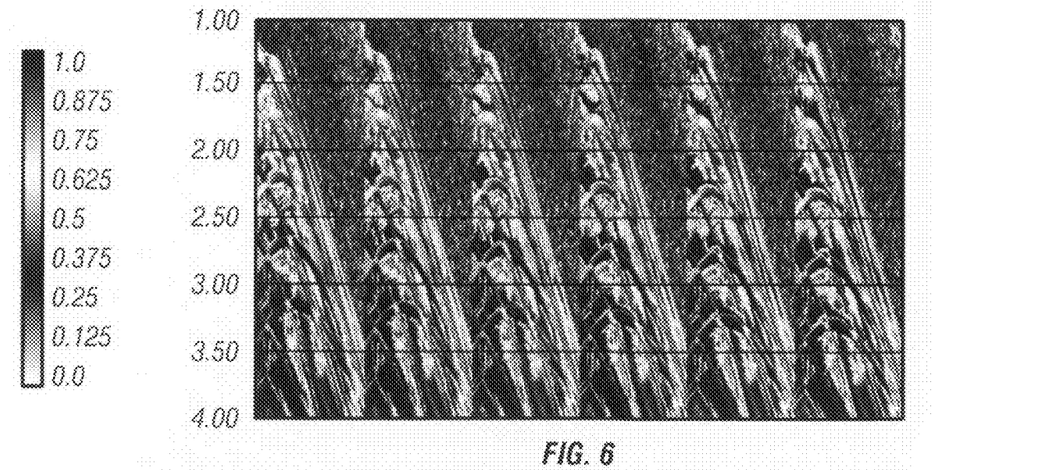
FIG. 6 is a section showing maximum semblance values corresponding to the cross-line slowness estimates in FIG. 5.

FIG. 5 shows cross-line slowness estimates obtained by this method for a synthetic data example. FIG. 5 shows that most events have significant cross-line slownesses in this example. FIG. 6 shows the maximum semblance values corresponding to the cross-line slowness estimates in FIG. 5. As would be expected for a clean synthetic dataset, these semblance values are high for the main events.

A better test of the cross-line slowness estimation is the performance of the method of the invention for a gather taken from field data. The corresponding range for the field data example is up to ±60 msec between adjacent streamers, which corresponds to a maximum cross-line incidence angle of ±64° for zero in-line slowness. As above, the absolute cross-line slowness value that gives the maximum semblance at each sample is determined.

Figure 7:
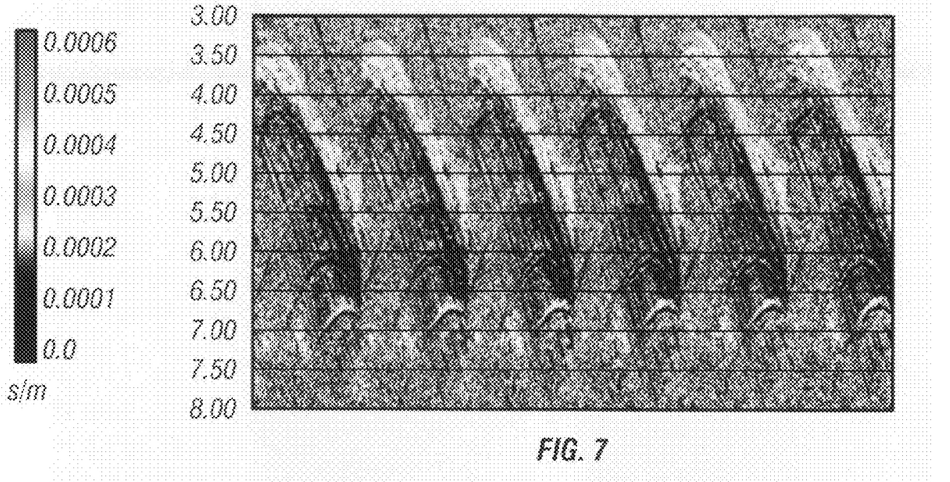
FIG. 7 is a section showing cross-line slowness estimates obtained for a field data example.
Figure 8:
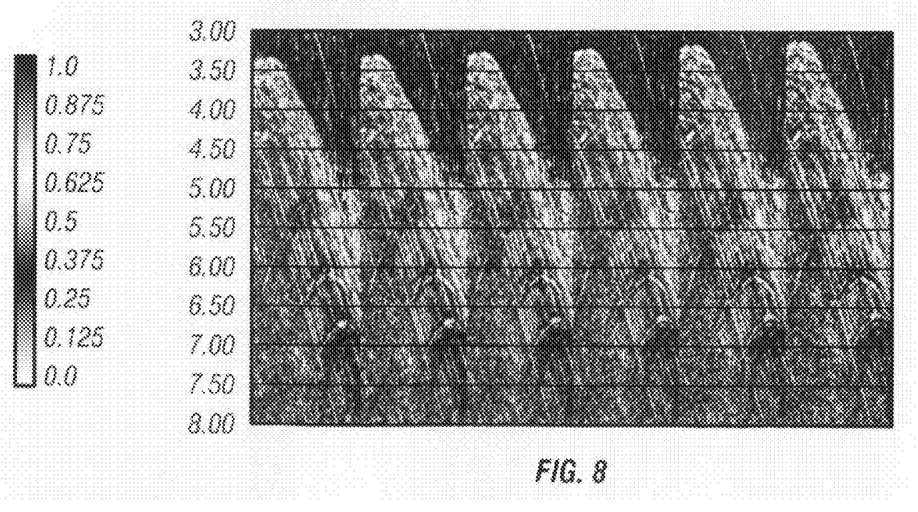
FIG. 8 is a section showing maximum semblance values corresponding to the cross-line slowness estimates in FIG. 7.

FIG. 7 shows the cross-line slowness estimates for a field data example. The imprint of the seismic events can be seen in FIG. 7, some of which have significant estimated cross-line slownesses. The shallowest events in particular have large cross-line slownesses. FIG. 8 shows the maximum semblance values corresponding to the cross-line slowness estimates shown in FIG. 7. FIG. 8 shows that the background semblance levels are high, but that the major events correspond to higher semblance levels. In an alternative embodiment of the invention, a semblance threshold may optionally be chosen that indicates that the cross-line slowness estimate is reliable. Wherever the maximum semblance is below this threshold, a specified default cross-line slowness can be used, with zero as the most usual choice.

Returning to FIG. 4, at 402, the resulting cross-line slowness estimates from 400 may optionally be smoothed. This smoothing is not a requirement of the invention, but makes further analysis more efficient. The next step is to perform the dual-sensor streamer processing steps for each streamer multiple times for different assumed cross-line slowness ($p_y$) values using Equation (1) to estimate vertical wavenumber $k_z$.

At 404, a maximum geophone scaling error $\epsilon$ is selected. The maximum geophone scaling error $\epsilon$ will be used to determine iterative steps in the geophone scaling factors that determine iterative steps in the incidence angles $\alpha$.

If the current cross-line slowness $p_y$ value used in the calculation is designated in the iterative scheme as $p_y^n$, with corresponding incidence angle $\alpha^n$, then this iterative scheme allows determining the next cross-line slowness $p_y$ value that should be used, which is designated in the iterative scheme as $p_y^{n+1}$. At 406, the iterative scheme starts with the first cross-line slowness value to be used (which is typically zero) and proceeds iteratively as follows:

$$p_y^n = \frac{\sin\alpha^n}{c}. \quad (2)$$

At 408, the next iteratively-determined incidence angle $\alpha^{n+1}$, is determined. Successive iterative values for the incidence angle $\alpha^n$ are defined in terms of the geophone scaling error $\epsilon$ from 404 by the relation:

$$\frac{1}{\cos\alpha^{n+1}} - \frac{1}{\cos\alpha^n} = \varepsilon. \quad (3)$$

Equation (3) is equivalent to the relation:

$$\cos\alpha^{n+1} = \frac{1}{\frac{1}{\cos\alpha^n} + \varepsilon}. \quad (4)$$

At 410, the next iteratively-determined cross-line slowness is determined. Solving for the next iterative value for incidence angle $\alpha^{n+1}$ from Equation (4) in 408 yields the next iterative value for cross-line slowness $p_y^{n+1}$:

$$p_y^{n+1} = \frac{\sin\alpha^{n+1}}{c}. \quad (5)$$

At 412, multiple shot gathers are constructed from the cross-line slowness values $p_y$ from 410. These shot gathers are constructed using the procedure described in FIG. 2 for each cross-line slowness value. Thus, if the first cross-line slowness value modeled is zero, Equations (2)-(5) can be used repeatedly to determine all subsequent cross-line slowness values to be modeled until a maximum slowness smaller or equal to the maximum slowness used in the determination of actual in 300 is reached. Note that the calculations in Equations (2)-(5) above are based on an assumed zero in-line slowness. Hence, where the in-line incidence angle is significant, the geophone scaling error for cross-line slownesses between the discrete values chosen will be smaller than E.

At 414, a single shot gather is constructed from the gathers created in 412 based on the cross-line slowness $p_y$ value determined for each sample. At each location the sample in the output gather is a weighted average of the corresponding samples in the constant $p_y$ sections computed for the two closest $p_y$ values. This weighted average yields the corrected particle motion sensor signal generated in 308 in FIG. 3.

In a further embodiment, the contributions from different streamers are weighted according to their distance from the streamer under consideration when calculating the semblance. This weighting can improve the accuracy with which the cross-line slownesses can be estimated, and hence, the treatment of events with significant curvature. This improved accuracy is particularly important for data acquired in shallow water areas for which shallow reflection events might be expected to exhibit significant curvature in the cross-line direction.

In a maximum semblance approach, such as employed in an embodiment of the invention discussed above, the cross-line slowness is determined for the most coherent event at each sample position. Where multiple events cross at a particular sample, the less coherent events that cross at the same position would not necessarily be scaled correctly. Methods for obtaining multiple cross-line slownesses for each sample should therefore be employed. In one embodiment of the invention, filters are applied (for example, in the f-$k_x$ or tau-p domains) to divide the shot record into segments with different in-line dip ranges, and then to determine the cross-line slowness independently for each segment. If the conflicting events at a particular sample location have different in-line dips such that they fall into different segments, this approach will allow the events to be separated. Then, the method described above in the discussion of the flowchart in FIG. 4 is repeated for each of the segments and the resulting shot gathers from each of the segments are summed into a single shot gather.

A further concern is the possibly large number of cross-line slownesses that must be calculated and used in order to obtain a high degree of accuracy. However, this assumes that the whole record must be processed each time. Since events with a significant component of cross-line slowness are generally confined to the shallowest part of the section, there may be scope to process only part of the record multiple times. In this case, the method of co-pending U.S. patent application Ser. No. 12/291,907, "Method for Optimum Combination of Pressure and Particle Motion Sensors for a 3-D Spread of Dual Sensor Marine Seismic Streamers", filed Nov. 14, 2008, including among the inventors the co-inventors of the present application, and assigned to an affiliate company of the assignee of the present invention, can be adapted to use the method of the present invention to process the portion of the seismic data that requires the cross-line slowness to be taken into account. In addition it may be possible to relax the accuracy requirement for calculating the cross-line slowness step in Equations (2)-(5), without materially degrading the result, thus reducing the number of slownesses that must be used.

While the foregoing example is described in terms of determining upgoing pressure signals, it will be appreciated by those skilled in the art that it is also possible to use the method described herein to determine downgoing pressure signals, or upgoing or downgoing motion or velocity signals, as is well described in the Vaage et al. '283 patent.

The invention has been discussed above as a method, for illustrative purposes only, but can also be implemented as a system. In one embodiment, the system of the invention is implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A method for combining signals of pressure sensors and particle motion sensors in towed marine seismic streamers, comprising:
    converting seismic signals recorded in the towed marine seismic streamers into at least one of upgoing and downgoing components of the seismic signals, the seismic signals representative of characteristics of subsurface earth formations and acquired by deployment of a plurality of pressure sensors and particle motion sensors overlying an area of the earth's subsurface to be evaluated, the sensors generating at least one of an electrical and optical signal in response to seismic energy, by the following:
        determining cross-line slownesses for samples in the signals in the streamers;
        selecting a range of assumed cross-line slownesses;
        determining vertical wavenumbers for the range of assumed cross-line slownesses;
        using the determined vertical wavenumbers to correct the particle motion sensor signals for angle of incidence along the direction of the streamers and transverse thereto, to generate corrected particle motion sensor signals;
        combining the corrected particle motion sensor signals based on the determined cross-line slowness for the samples; and
        using the corrected particle motion sensor signal and the pressure sensor signal to determine at least one of upgoing and downgoing pressure components and upgoing and downgoing particle motion components of the particle motion sensor and pressure sensor signals, useful for imaging the earth's subsurface.

2. The method of claim 1, wherein the determining the cross-line slownesses comprises:
    estimating cross-line slownesses at the samples in the streamers;
    determining a series of cross-line slownesses to be modeled;
    combining the pressure and particle motion sensor signals for the series of cross-line slowness; and
    building a single shot gather from the multiple gathers, based on the cross-line slownesses estimated for the samples.

3. The method of claim 2, wherein the estimating cross-line slownesses at the samples further comprises smoothing the cross-line slownesses.

4. The method of claim 2, wherein the determining incidence angles and cross-line slownesses at the samples is done using maximum semblance analysis.

5. The method of claim 2, wherein the determining the series of cross-line slownesses is performed iteratively based upon a selected maximum sensor scaling error.

6. The method of claim 5, wherein the determining the series of cross-line slownesses to be modeled comprises applying the following iterative scheme of equations:

$$p_y^n = \frac{\sin\alpha^n}{c},$$

where $p_y^n$ is a current cross-line slowness value, $\alpha^n$ is a corresponding incidence angle, and c is velocity of sound in the medium, $$\cos\alpha^{n+1} = \frac{1}{\frac{1}{\cos\alpha^n} + \varepsilon},$$

where $\alpha^{n+1}$ is a next iteratively-determined incidence angle and $\epsilon$ is the selected maximum sensor scaling error, and $$p_y^{n+1} = \frac{\sin\alpha^{n+1}}{c},$$

where $p_y^{n+1}$ is a next iteratively-determined value for cross-line slowness.

7. The method of claim 1, wherein the using the determined vertical wavenumber and using the corrected particle motion sensor signal are performed in the frequency-wave number domain.

8. The method of claim 1, wherein the using the determined vertical wavenumber comprises:
    simulating a response of the motion responsive sensors within a selected frequency range using the detected pressure sensor signal;
    excluding portions of the detected particle motion sensor signal in the selected frequency range; and
    combining the pressure sensor simulation of the particle motion sensor signal in the selected frequency range with the detected particle motion sensor signal, excluding the portions in the selected frequency range.

9. The method of claim 2, wherein the determining the cross-line slownesses for samples with conflicting events comprises:
    applying filters to separate the signals into segments with different in-line dip ranges;
    estimating cross-line slownesses at the samples in the segments;
    determining a series of cross-line slownesses to be modeled for the segments;
    combining the pressure and particle motion sensor signals for the series of cross-line slownesses for the segments;
    building single shot gathers for the segments from the multiple gathers for the segments, based on the cross-line slownesses estimated for the samples in the segments; and
    combining the shot gathers for the segments into a single gather.

10. A computer readable medium with a computer program stored thereon, the program having logic operable to cause a programmable computer to perform steps comprising:
    determining cross-line slownesses for samples in signals of pressure sensors and particle motion sensors in towed marine seismic streamers;
    selecting a range of assumed cross-line slownesses;
    determining vertical wavenumbers for the range of assumed cross-line slownesses;
    using the determined vertical wavenumbers to correct the particle motion sensor signals for angle of incidence along the direction of the seismic streamers and transverse thereto, to generate corrected particle motion sensor signals;
    combining the corrected particle motion sensor signals based on the determined cross-line slownesses for the samples; and
    using the corrected particle motion sensor signal and the pressure sensor signal to determine at least one of upgoing and downgoing pressure components and upgoing and downgoing particle motion components of the particle motion sensor and pressure sensor signals.

11. The medium of claim 10, wherein the determining the cross-line slownesses comprises:
    estimating a cross-line slowness at the samples in the streamers;
    determining a series of cross-line slownesses to be modeled;
    combining the pressure and particle motion sensor signals for the series of cross-line slowness; and
    building a single shot gather from the multiple gathers based on the cross-line slownesses estimated for the samples.

12. The medium of claim 11, wherein the estimating cross-line slownesses at the samples further comprises smoothing the cross-line slownesses.

13. The medium of claim 11, wherein the determining incidence angles and cross-line slownesses at the samples is done using maximum semblance analysis.

14. The medium of claim 11, wherein the determining the series of cross-line slownesses is performed iteratively based upon a selected maximum sensor scaling error.

15. The medium of claim 14, wherein the determining the series of cross-line slownesses to be modeled comprises applying the following iterative scheme of equations:

$$p_y^n = \frac{\sin\alpha^n}{c},$$

where $p_y^n$ is a current cross-line slowness value, $\alpha^n$ is a corresponding incidence angle, and c is velocity of sound in the medium, $$\cos\alpha^{n+1} = \frac{1}{\frac{1}{\cos\alpha^n} + \varepsilon},$$

where $\alpha^{+1}$ is a next iteratively-determined incidence angle and $\varepsilon$ is the selected maximum sensor scaling error, and $$p_y^{n+1} = \frac{\sin\alpha^{n+1}}{c},$$

where $p_y^{n+1}$ is a next iteratively-determined value for cross-line slowness.

16. The medium of claim 10, wherein the using the determined vertical wavenumber and using the corrected particle motion sensor signal are performed in the frequency-wave number domain.

17. The medium of claim 10, wherein the using the determined vertical wavenumber comprises;
    simulating a response of the motion responsive sensors within a selected frequency range using the detected pressure sensor signal;
    excluding portions of the detected particle motion sensor signal in the selected frequency range; and
    combining the pressure sensor simulation of the particle motion sensor signal in the selected frequency range with the detected particle motion sensor signal, excluding the portions in the selected frequency range.

18. The medium of claim 11, wherein the determining the cross-line slownesses for samples with conflicting events comprises:
    applying filters to separate the signals in the samples into segments with different in-line dip ranges;
    estimating cross-line slownesses at the samples in the segments;
    determining a series of cross-line slownesses to be modeled for the segments;
    combining the pressure and particle motion sensor signals for the series of cross-line slownesses for the segments;
    building single shot gathers for the segments from the multiple gathers for the segments, based on the cross-line slownesses estimated for the samples in the segments; and
    combining the shot gathers for the segments into a single gather.

* * * * *